US010382469B2

(12) United States Patent
Adams et al.

(10) Patent No.: US 10,382,469 B2
(45) Date of Patent: Aug. 13, 2019

(54) DOMAIN AGE REGISTRATION ALERT

(71) Applicant: Rapid7, Inc., Boston, MA (US)

(72) Inventors: Samuel Adams, Andover, MA (US); H D Moore, Austin, TX (US)

(73) Assignee: Rapid7, Inc., Boston, MA (US)

( * ) Notice: Subject to any disclaimer, the term of this patent is extended or adjusted under 35 U.S.C. 154(b) by 14 days.

(21) Appl. No.: 14/805,744

(22) Filed: Jul. 22, 2015

(65) Prior Publication Data
US 2017/0026400 A1 Jan. 26, 2017

(51) Int. Cl.
*H04L 29/06* (2006.01)
*H04L 29/12* (2006.01)

(52) U.S. Cl.
CPC ...... *H04L 63/1433* (2013.01); *H04L 63/1441* (2013.01); *H04L 61/1511* (2013.01); *H04L 61/2015* (2013.01); *H04L 63/0272* (2013.01); *H04L 63/0281* (2013.01)

(58) Field of Classification Search
CPC ............. H04L 63/1433; H04L 63/1441; H04L 61/1511; H04L 61/2015; H04L 63/0272; H04L 63/0281
See application file for complete search history.

(56) References Cited

U.S. PATENT DOCUMENTS

| 8,528,091 | B2 * | 9/2013 | Bowen | G06F 21/566 726/24 |
| 8,549,643 | B1 * | 10/2013 | Shou | G06F 21/556 455/410 |
| 8,776,196 | B1 * | 7/2014 | Oliver | H04L 63/1483 726/11 |
| 8,793,318 | B1 * | 7/2014 | Bruen | H04L 51/12 709/206 |
| 8,826,400 | B2 * | 9/2014 | Amaya Calvo | H04L 63/1441 726/6 |
| 9,426,171 | B1 * | 8/2016 | Jezorek | H04L 63/1433 |
| 9,430,501 | B1 * | 8/2016 | Yen | G06F 16/27 |
| 2007/0011224 | A1 * | 1/2007 | Mena | G06Q 30/02 709/200 |
| 2009/0006569 | A1 * | 1/2009 | Morss | H04L 51/12 709/206 |
| 2010/0077483 | A1 * | 3/2010 | Stolfo | G06F 21/554 726/24 |
| 2011/0185055 | A1 * | 7/2011 | Nappier | H04L 63/1433 709/224 |

(Continued)

OTHER PUBLICATIONS

Windows Security Log Event. https://www.ultimatewindowssecurity.com/securitylog/encyclopedia/event.aspx?eventID=4624, dated Jul. 8, 2010.*

(Continued)

*Primary Examiner* — John B King
*Assistant Examiner* — Richard W Cruz-Franqui
(74) *Attorney, Agent, or Firm* — Danielson Legal LLC

(57) ABSTRACT

Systems and methods of identifying a security risk by monitoring and generating alerts based on attempts to access web domains that have been registered within a short period of time and are therefore identified as "high-risk," including identifying an attempt to access a domain; receiving a registration date of the domain; and detecting a security risk based on the registration date of the domain.

16 Claims, 18 Drawing Sheets

(56) References Cited

U.S. PATENT DOCUMENTS

| | | | |
|---|---|---|---|
| 2012/0023156 A1* | 1/2012 | Ueda | H04L 67/02 709/203 |
| 2012/0084866 A1* | 4/2012 | Stolfo | G06F 21/554 726/25 |
| 2012/0108203 A1* | 5/2012 | Mechaley, Jr. | H04L 63/18 455/411 |
| 2013/0097699 A1* | 4/2013 | Balupari | G06F 21/552 726/22 |
| 2013/0305368 A1* | 11/2013 | Ford | G06F 21/568 726/23 |
| 2013/0318603 A1* | 11/2013 | Merza | H04L 63/1441 726/22 |
| 2014/0282016 A1* | 9/2014 | Hosier, Jr. | H04W 4/08 715/733 |
| 2015/0271200 A1* | 9/2015 | Brady | H04L 63/1416 726/4 |
| 2015/0319167 A1* | 11/2015 | Brand | H04L 63/0853 713/156 |
| 2016/0006686 A1* | 1/2016 | Arberg | H04L 29/1282 709/245 |
| 2016/0036816 A1* | 2/2016 | Srinivasan | H04L 63/10 726/1 |
| 2016/0065609 A1* | 3/2016 | Yan | H04L 61/1511 726/25 |
| 2016/0142429 A1* | 5/2016 | Renteria | H04L 63/1416 726/23 |
| 2016/0248795 A1* | 8/2016 | Chien | H04L 63/1458 |
| 2016/0337391 A1* | 11/2016 | McKinney | H04L 63/1433 |
| 2016/0359876 A1* | 12/2016 | Touboul | G06F 21/577 |
| 2017/0026400 A1* | 1/2017 | Adams | H04L 63/1433 |
| 2017/0325056 A1* | 11/2017 | Mehta | H04W 4/90 |

OTHER PUBLICATIONS

U.S. Appl. No. 14/805,744 NPL Search—Google Scholar (Year: 2019).*

* cited by examiner

Policy Enforcement Process S200 userinsight | Search | 489 □1 demo@razor.com▼

HOME  LOCATIONS  SERVICES  INCIDENTS  THREATS  INVESTIGATIONS [BETA]  COLLECTORS  SETTINGS

COMPANY NUMBERS
| | |
|---|---|
| ACTIVE USERS | 911 |
| DISABLED USERS | 546 |
| SERVICE ACCOUNTS | 184 |
| ADMINISTRATORS | 24 |
| SHARED ACCOUNTS | 19 |
| LINKED ACCOUNTS | 71 |
| ASSETS | 9406 |
| RESTRICTED ASSETS | 19 |
| THREATS | 19 |
| MOBILE DEVICES | 1102 |
| UNIQUE PROCESSES | 26 |
| RARE PROCESSES | 5 |
| VULNERABILITIES | 592 |
| APPLICATIONS | 1 |
| STAT ANOMALIES | 98 |

ALERTS

89 ↯ NEW INCIDENTS     1 □ COLLECTOR ISSUES

HONEY USER AUTHENTICATION [100]
Honey user account banderson had authentication attempts at least 100 times

INGRESS LOCATION REPLACEMENT DRAWING
REPLACEMENT DRAWING

WATCHLIST (53)
Tina Diaz
Security Researcher II, Engineering
Benedict Cumberbatch
Sandra Anderson (Admin)
Mary Moore
Marketing Content Manager, Marketing
Ida Hart
Communications Program Manager, Marketing
Lucia Gross
Director, Corporate Communications, Marketing CLOUD SERVICES (124)
Office365
NetSuite
Amazon AWS

FIG. 10

DOMAIN AGE REGISTRATION ALERT

TECHNICAL FIELD

Embodiments of the invention generally relate to systems and methods for monitoring a network environment for security risks, and more specifically to monitoring network requests and generating alerts when the network request are associated with high-risk domains.

BACKGROUND

Secure networked environments may be subject to a myriad of attempts to authenticate to, access, and use their resources and assets without proper credentials. Such networked environments are difficult to monitor and unauthorized attempts to access are difficult to detect. Further, even if an unauthorized access attempt is detected, it may only be classified as a "failed" attempt, which provides little information concerning, e.g., the source of the attempt, whether the attempt originates with an authorized or an unauthorized user, etc.

One practical problem is that security professionals must review activity logs and perform additional analysis to determine if unauthorized authentication attempts were made on an asset. Such techniques may rely, for example, on a denied parties list, domain information for known "bad" actors, or repeated attempts to authenticate without the proper credentials.

With regard to tracing, for networks having multiple assets there may be different accounts active on each asset. Further, assets from different networks can be communicably linked to assets in other networks, each asset having different active accounts. Some of these different accounts may in fact be associated with each other, such as when they are associated with the same user. A user may authenticate using account "X" on a first network asset and then through machine-to-machine authentication authenticate using account "Y" on a second network asset. Machine-to-machine authentication may purposefully or incidentally obfuscate the identity of the account or the user through account switching.

Activity at a network asset may be monitored at an account level using various techniques, including event logs. The logged information may include the identity of the asset and the information for the account associated with the logged event. Presently, the typical process for reviewing event information is for a security professional to manually gather information from various event logs, after the fact, and piece together authentication attempts and correlate accounts. This is a time consuming process and prone to error. Further, these techniques do not leverage the information gathered about the accounts to improve or update network or asset policies, nor enable active network monitoring.

Activity on a network may be monitored at a device level using "honeypot" virtual appliances. The virtual appliances may be installed on network assets, and are used, for example, on corporate servers. Honeypot devices may act as decoys—attracting access attempts or other activity by unauthorized users. However, existing "honeypot" tools require set up and configuration. The tool configuration settings, such as open ports, whitelists, and health status, are typically managed in isolation and require access to the individual honeypots for changing their settings. This process can be cumbersome and time consuming if an administrator desires to deploy a large number of honeypots across one or more monitored networks.

Attempts to access resources that originate from certain domains may present risks, and so may attempts to access resources in certain domains. Existing techniques take into account registries of disavowed domains that are known to present security risks, but do not typically take into account characteristics of a domain that might be associated with security risks.

Accordingly, there is a need for robust systems and methods that detect security threats, unauthorized activity, and trace account usage by tracking and correlating machine-to-machine authentication and mapping accounts across network assets, including across multiple assets, in such a way as to describe how a user or account utilizes various assets on a network. There is also a need for systems and methods that will facilitate improvements and updates to policy enforcement for account usage at a network and an asset level, as part of a security and management ecosystem. Finally, there is also a need for a monitoring system that takes into account characteristics of a domain that might be associated with a security risk.

SUMMARY

In general, various aspects of the systems, methods, and apparatus described herein are directed toward a security and management ecosystem for the detection of security threats, unauthorized activity, mapping accounts across network assets, tracking the way a user utilizes multiple accounts to access various assets on a network, monitoring requests to and from domains that present a security risk, and monitoring a network environment using a central monitoring console to manage the feedback from these preconfigured virtual appliances and view it alongside other activity on the network environment. In addition, the system and methods described herein are directed to enforcing network policies based on the account mapping described above.

According to one aspect of the present invention a method for identifying a security risk is provided. The method includes a identifying an attempt to access a domain; receiving a registration date of the domain; and detecting a security risk based on the registration date of the domain.

In one embodiment, identifying an attempt to access a domain comprises identifying a domain name system (DNS) request.

In another embodiment, receiving a registration date of the domain comprises querying a database for the date of registration of the domain.

In one embodiment, identifying a security risk based on the registration date of the domain includes comparing the registration date to a threshold date. The threshold date may be a pre-defined date.

In another embodiment, an alert is generated based on the detected security risk.

In another embodiment, the detected security risk is mitigated.

In another embodiment, identifying an attempt to access a domain comprises analyzing one or more logs to identify one or more attempts to access one or more domains.

According to another aspect of the present invention a system for detecting a security risk is provided. The system includes a database of registration information for a plurality of domains; and a server configured to identify an attempt to access a domain, retrieve age information of the domain from the database, and detect a security risk based on the age information of the domain.

In one embodiment, the server is further configured to identify a domain name system request.

In another embodiment, the database is a public database.

In another embodiment, the database is a private database.

In another embodiment, the server is further configured to compare the age information of the domain to a threshold value. The threshold value may be a pre-defined value.

In another embodiment, the server is further configured to generate an alert based on the detected security risk.

In another embodiment, the server is further configured to initiate mitigation steps based on the detected security risk.

In another embodiment, the server is a proxy server.

In another embodiment, the server is further configured to analyze one or more logs to identify one or more attempts to access one or more domains.

In another embodiment, the database and the server are co-located on the same network.

In another embodiment, the server is further configured to identify a user who initiated the attempt to access the domain. The user may be identified based on an authentication record and a second database associating at least one device label with user information. The device label may be a domain name or an Internet Protocol (IP) address. The second database may be updated upon a dynamic host configuration protocol lease renewal, a virtual private network Internet Protocol address assignment, or both. The authentication record may be an active directory log.

The foregoing and other features and advantages of the present invention will be made more apparent from the descriptions, drawings, and claims that follow. One of ordinary skill in the art, based on this disclosure, would understand that other aspects and advantages of the present invention exist.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 10 presents a screenshot of a graphical user interface for monitoring a networked environment in accord with the present invention;

DETAILED DESCRIPTION

Described herein are various embodiments of methods and systems consistent with the present invention. These embodiments are exemplary and should not be interpreted to limit the scope that one of ordinary skill in the art would give to the invention. In some instances, well-known operations are not described in detail to avoid unnecessarily obscuring the present invention.

Figure 1:
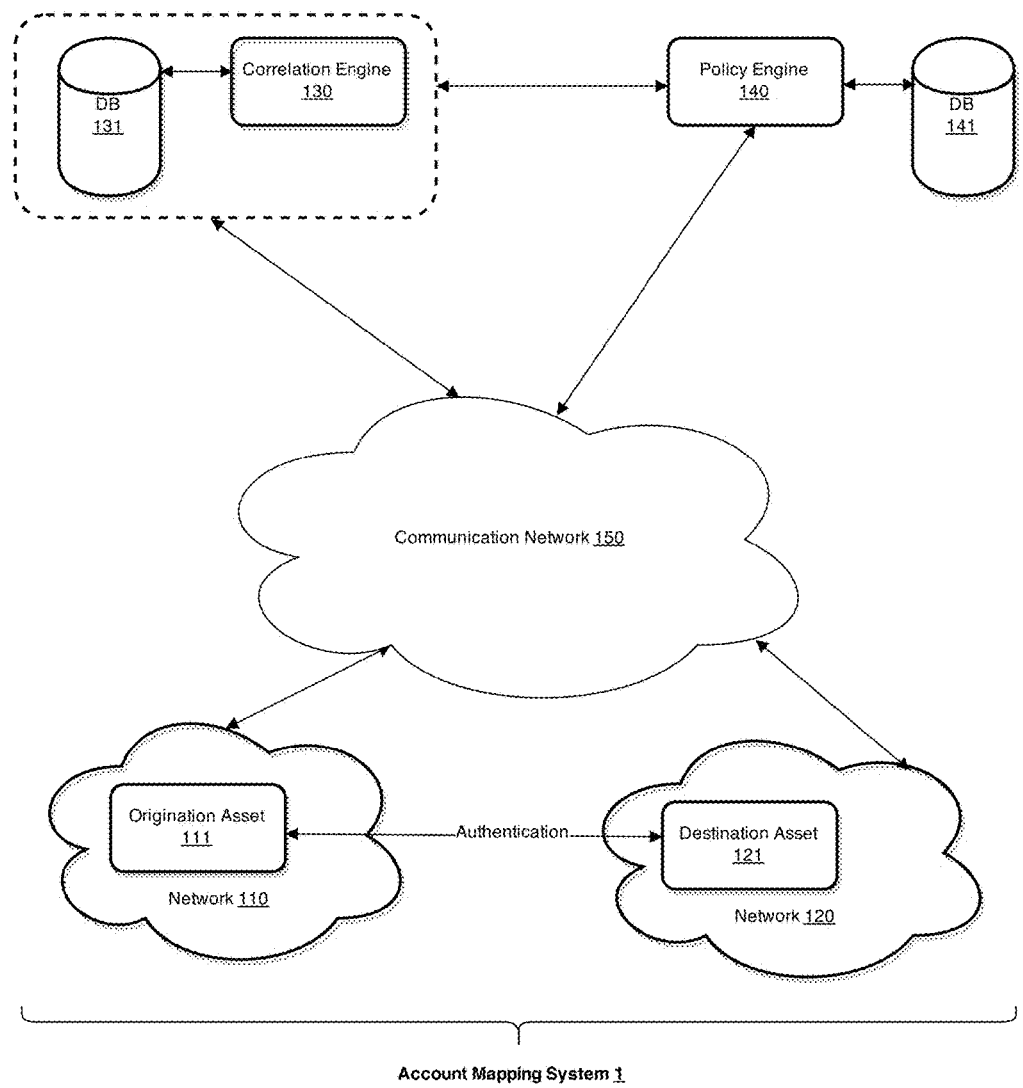
FIG. 1 illustrates a system that utilizes account lateral movement mapping to manage a network according to an exemplary embodiment of the invention.

An exemplary system for utilizing account lateral movement mapping data to manage a network is illustrated in FIG. 1. System 1 as depicted includes Network 110, Network 120, Correlation Engine 130, a Policy Engine 140, and Communication Network 150, although one of ordinary skill would recognize that System 1 may include multiple copies of these components and, in particular, multiple networks each comprising a plurality of interconnected assets.

Network 110 and Network 120 each are comprised of network assets. In the exemplary embodiments described herein, the network assets are identified as falling into the category of Origination Asset 111 or Destination Asset 121 in the context of an authentication process. However, network assets may be anything that is part of, relates to, or supports information-related activities. Network assets may include hardware devices (e.g., servers, switches, and general purpose computers), software, databases, and combinations thereof. A particular pair of network assets designated as Origination Asset 111 and Destination Asset 121 could exchange roles as the asset originating an authentication request and the asset receiving an authentication request.

Correlation Engine 130 has access to a Database 131. The Correlation Engine 130 is operable to correlate account information in order to generate the account lateral movement mapping data that is used in embodiments of the present invention. The Database 131 may be used to store the account lateral movement mapping data as well as other data used in the correlation process.

Correlation Engine 130 is in communication with Origination Asset 111, Destination Asset 121, and Policy Engine 140 via Communication Network 150. Event logs for Origination Asset 111 and Destination Asset 121 are transferred to Correlation Engine 130 over Communication Network 150. Correlation Engine 130 transfers account lateral movement mapping data to the Policy Engine 140.

Collection of the event logs maybe accomplished using any technique that preserves the information that would assist with generating account lateral movement mapping data. In one exemplary embodiment the System 1 collects the event logs by authenticating to management protocols of the network assets using administrative credentials. One example of a management protocol is Windows™ Management Instrumentation. Other implementations of the Web-Based Enterprise Management (WBEM) and Common Information Model (CIM) standards from the Distributed Management Task Force (DMTF) may also be used, such as, Web-Based Enterprise Management Solutions, Web-Based Enterprise Management Services, OpenPegasus, and Open Web-Based Enterprise Management.

In one exemplary embodiment the Correlation Engine 130 includes the functionality to collect the event logs using the techniques described herein. In another embodiment, one or more third-party administrative tools collect the event logs, and the Correlation Engine 130 interfaces with the third-party administrative tools.

The event logs may include any information that would assist with generating account lateral movement mapping data. In an exemplary machine-to-machine authentication process, the event data logged in an event log for the asset originating the authentication request (e.g., Origination Asset 111) includes the local account used and identifying information for the destination asset (e.g., Destination Asset 121). Similarly, the event data logged in an event log for the destination asset (e.g., Destination Asset 121) includes the local account used and identifying information for the asset originating the authentication request (e.g., Origination Asset 121). Accordingly, based on such event logs the Correlation Engine 130 may determine that the account on the originating asset—e.g., account 'X'—is correlated to the account authenticated to at the destination asset—e.g., account 'Y'.

Correlation Engine 130 and Policy Engine 140 may be special purpose hardware, special purpose software running on a general purpose hardware, or some combination thereof, that operates on or communicates with the Networks 110 and 120 and Origination Asset 111 and Destination Asset 121 in the manners described herein including, in the case of Policy Engine 140, to regulate account activity, including machine-to-machine authentication.

Policy Engine 140 includes an interface (not shown) that allows users, typically system administrators, to specify and modify the policies enforced by Policy Engine 140. Policy Engine 140 also uses the account lateral movement mapping data to specify and modify its policies and to enable management of the System 1. Policy Engine 140 is linked to a Database 141 that stores the policy rules and other relevant information for the Policy Engine 140.

Each of Database 131 and Database 141 may be a searchable database and may comprise, include or interface to a relational database or noSQL database (such as Cassandra NoSQL). Other databases, such as a query format database, a Structured Query Language (SQL) database, a storage area network (SAN), or another similar data storage device, query format, platform or resource may be used. Database 131 and Database 141 may each comprise a single database or a collection of databases, dedicated or otherwise. In one embodiment, Database 131 and Database 141 may store or cooperate with other databases to store the various data and information described herein. In some embodiments, Database 131 and Database 141 may comprise a file management system, program or application for storing and maintaining data and information used or generated by the various features and functions of the systems and methods described herein.

As noted above, Communication Network 150 may communicably link the various modules and devices noted in System 1. The Communication Network 150 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (IN) connection, a synchronous optical network (SONET) connection, a digital T1, T3, E1 or E3 line, a Digital Data Service (DDS) connection, a Digital Subscriber Line (DSL) connection, an Ethernet connection, an Integrated Services Digital Network (ISDN) line, a dial-up port such as a V.90, a V.34 or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

Communication Network 150 may also comprise, include or interface to any one or more of a Wireless Application Protocol (WAP) link, a Wi-Fi link, a microwave link, a General Packet Radio Service (GPRS) link, a Global System for Mobile Communication (GSM) link, a Code Division Multiple Access (CDMA) link or a Time Division Multiple Access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based radio frequency link.

In some embodiments, Communication Network 150 may comprise a satellite communications network; such as a direct broadcast communication system (DBS) having the requisite number of dishes, satellites and transmitter/receiver boxes, for example. Network 300 may also comprise a telephone communications network, such as the Public Switched Telephone Network (PSTN). In another embodiment, Communication Network 150 may comprise a Personal Branch Exchange (PBX), which may further connect to the PSTN.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Figure 2:
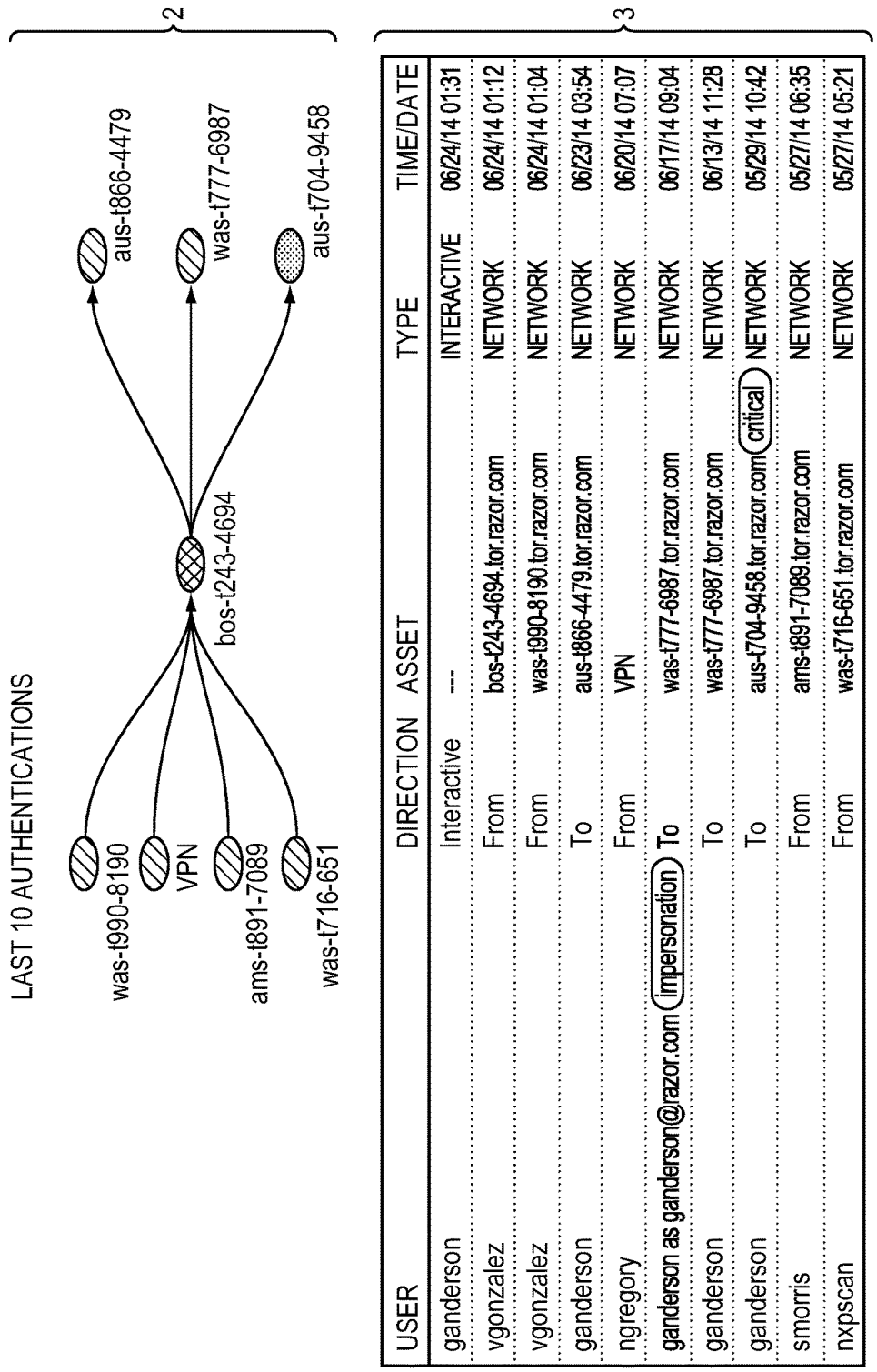
FIG. 2 illustrates a process for gathering account information and correlating accounts to facilitate account lateral movement mapping according to an exemplary embodiment of the invention.

FIG. 2 illustrates an example of account lateral movement mapping data organized graphically. In one exemplary embodiment of the invention, this representation is generated and displayed as part of a graphical user interface (GUI). The GUI may be displayed for a system administrator account for the Correlation Engine 130, the Policy Engine 140, or on a workstation or server that is remote from both the Correlation Engine 130 and the Policy Engine 140 and having administrative access thereto. Within Element 2, each solid circle represents a network asset, and each directional arrow represents an event (e.g., authentication) involving the two graphically-connected network assets.

Associated with each event is event data. Exemplary event data is displayed in Element 3. In this example, 'ngregory' authenticated to 'bos-t243-4694' from a VPN controller. Further, 'ganderson' authenticated to 'bos-t243-4694' from the login screen and keyboard (i.e. interactive). Finally, 'ganderson' authenticated to 'was-t777-6987' as a different account, 'ganderson@razor.com,' and the type of authentication was unknown.

Upon selecting an asset, the event information displayed 3 transitions to the event information associated with the selected asset. Accordingly, an operator following interconnected network assets by moving a cursor laterally, following the directional arrows, can observe a user accessing multiple assets through multiple accounts, with multiple "account switches" being observed, stored, and used to enforce policies for the assets and the networks of which they are a part.

Figure 3:
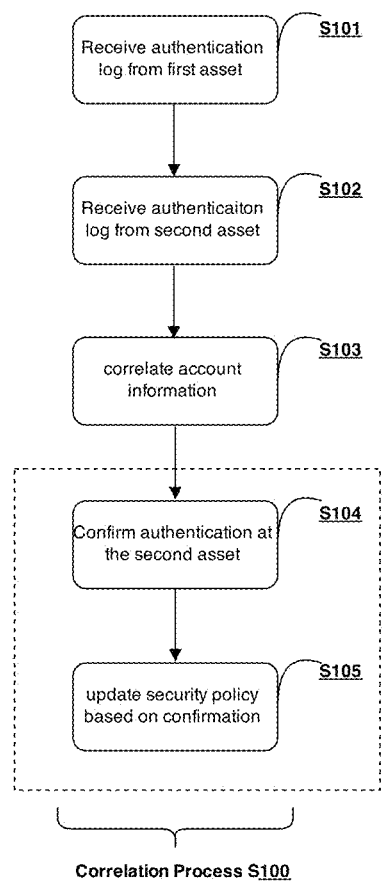
FIG. 3 illustrates a process for utilizing account lateral movement mapping to enable authentication policies according to an exemplary embodiment of the invention.

An exemplary operation of the System 1 will now be described with reference to FIGS. 3-5. Turning first to FIG. 3, an exemplary Correlation Process 100 is illustrated with reference to Steps S101 through S105. First, the Correlation Engine 130 receives event logs, including authentication logs, from a plurality of assets, including the Origination Asset 111 and the Destination Asset 112 (S101 and S102). The Correlation Engine 130 generates account lateral mapping data by correlating the information in the event logs from the Origination Asset 111 and the Destination Asset 112 (S103). This information may be stored as a record.

Steps S104 and S105 are called out with a dashed box in FIG. 3 because they relate to a confirmatory step to generate and update policies related to networks and assets. Upon correlating account 'X' and account 'Y,' i.e., two different accounts utilized by a single user to access two different network assets, the Correlation Engine 130 prompts an operator, for example, a system admin, to confirm whether the authentication is permitted (S104). The prompt may be sent using known communication techniques over Communication Network 150, including without limitation to an administrative interface, an e-mail address, a secure messaging system account, the monitoring application hosting the database, or other similar applications.

If the indication from the operator is that the authentication was not permitted, the operator may be prompted for additional policy making information. For example, the operator may indicate that the reason that the authentication is not permitted is related to one or more of the identity of the Origination Asset 111, the account used on the Origination Asset 111, the identity of the Destination Asset 111, the account used on the Destination Asset 111, the identity of the Network 110 or the Network 120. Further, the reason may be related to specific classes that the accounts, assets, or networks belong to, including user groups or security level classes.

Based on the operator responses to the confirmatory prompts, the Policy Engine 140 may update its policies as they relate to the affected networks, assets, accounts, etc., and combinations thereof (S105). In one exemplary embodiment the Correlation Engine 130 may prompt the operator and send the operator's responses, possibly after processing or formatting, to the Policy Engine 140. In another exemplary embodiment the Policy Engine 140 may itself prompt the operator for information used by the Policy Engine 140 to formulate policy.

Figure 4:
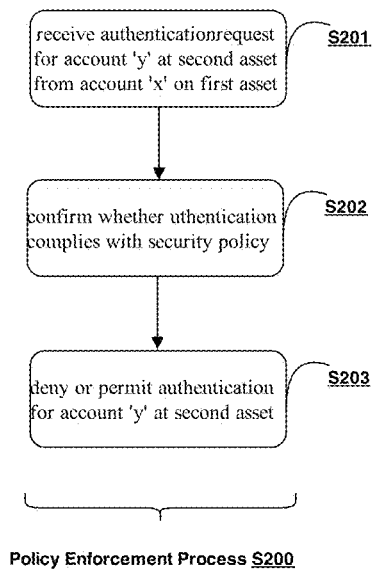
FIG. 4 illustrates a process for utilizing account lateral movement mapping to enforce authentication policies according to an exemplary embodiment of the invention.

An exemplary Policy Enforcement Process S200 is described in FIG. 4 and steps S201 through S203. In this exemplary Process S200, an authentication request for account 'Y' is received at a destination asset (S201). The request is for machine-to-machine authentication, and account 'X' is used at the originating asset for the request. Any number of policy rules may apply to this authentication request. If the relevant policies apply (S202) then the authentication request may be denied or accepted (S203). In other embodiments, an alert may also be generated. In some cases, only an alert may be generated and the authentication request may be allowed to proceed even if it violates a defined policy.

Figure 5:
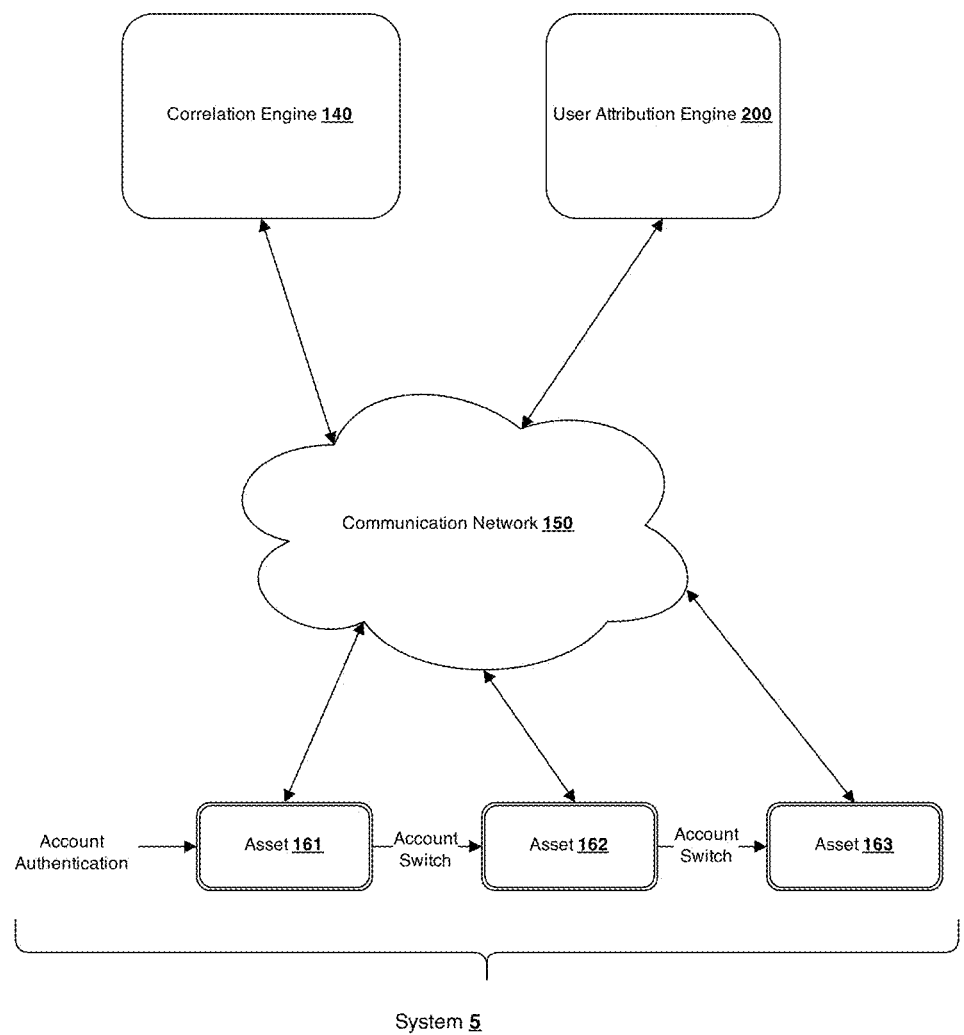
FIG. 5 illustrates a system utilizing account lateral movement mapping to manage a network according to an exemplary embodiment of the invention.

FIG. 5 illustrates System 5, which includes a User Attribution Engine 200 and a Correlation Engine 140. The System 5 may interact with User Attribution Engine 200 in order to attribute events with specific user identity or identities.

The User Attribution Engine 200 has access to a Database (not shown) that is an identity store with information associating accounts with Internet Protocol (IP) addresses and host names. In one exemplary embodiment the identity store is compatible with the Lightweight Directory Access Protocol (LDAP).

Several sources may be used to associate accounts with IP addresses and host names. When a device joins a local network, it may be assigned an IP address. For example, the device may be authenticated using dynamic host configuration protocol (DHCP) to determine if it is eligible to be assigned an IP address. For each DHCP lease, the User Attribution Engine 200 logs the host name and leased IP address. Each time a DHCP lease is renewed or reassigned the host name and the IP address associated with the lease is updated in the system. In this manner, DHCP leases are tracked in real-time for host name and IP addresses associated with account information.

A device may join a private network over a public network and send data as if connected to the private network by way of a virtual private network (VPN). When a device authenticates to a VPN, the VPN assigns the device an IP address. The User Attribution Engine 200 tracks VPN sessions as they are created and ended. The IP address assigned to a device during a VPN session may be stored as well as the account used to connect to the VPN and other event data.

In one embodiment, the User Attribution Engine 200 may also track internal authentications. For Active Directory and similar authentication tools and domain authentication tools, the IP address and/or host name associated with the authentication is tracked. Using the IP address and account information stored by the User Attribution Engine 200, the account information may be associated with authentication operations at the system level.

Accordingly, event information including IP addresses may be tracked back to a specific account even in the event of multiple "account switches"—as illustrated in Assets 161, 162, and 163—based on the User Attribution System 5 and the account lateral movement mapping data generated and stored by the Correlation Engine 140.

Figure 6:
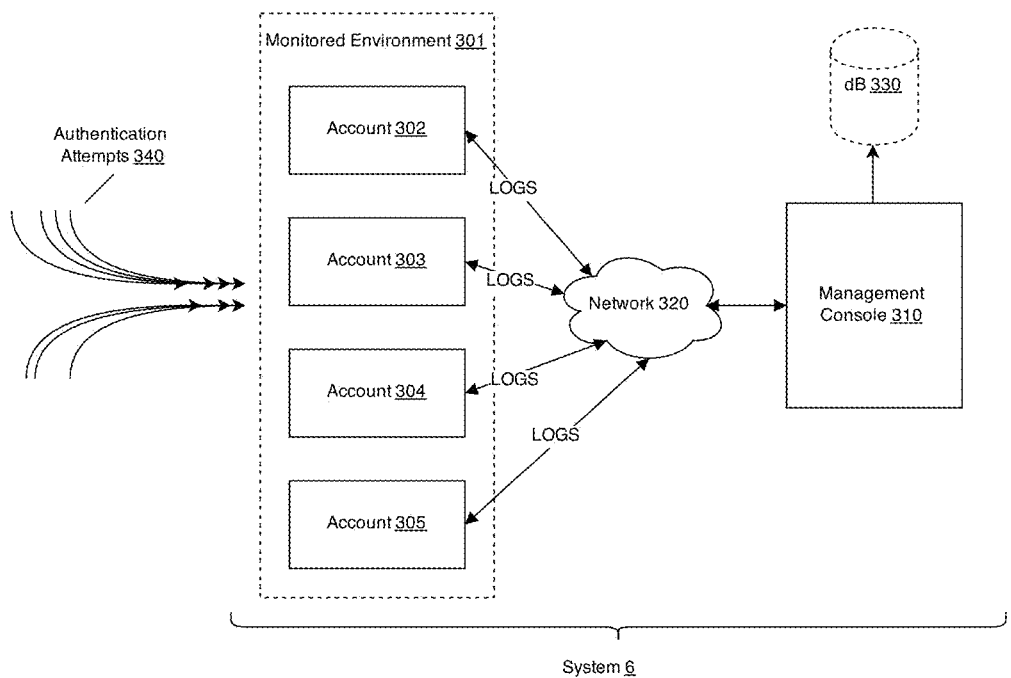
FIG. 6 illustrates a system that utilizes pseudo-accounts to detect activity that represents a security risk according to an exemplary embodiment of the invention.

FIG. 6 illustrates Honey User System 300, which utilizes pseudo-accounts to detect activity that may be a security risk according to an exemplary embodiment of the invention. Honey User System 300 includes a Monitored Environment 301, a Communication Network 320, a Management Console 310, and a Database 330. Monitored Environment 301 may be a domain, a computer, an active directory, a networked environment, or any environment that may have multiple accounts associated with it. In this exemplary embodiment, Accounts 302 through 305 are associated with the Monitored Environment 301. The Accounts 302 through 305 may be different user accounts associated with the same or different assets (virtual or physical) on a computer or in a network.

For purposes of the present invention, one or more of Accounts 302 through 305 are pseudo-accounts. Pseudo-accounts are accounts for which authentication should never occur. Pseudo-accounts may be created with credentials that are not and will not be assigned to any user and deployed into the Honey System 300. In one exemplary embodiment a Pseudo-account is an account that has been marked for deletion. In another exemplary embodiment, a Pseudo-account is an account that has been inactive for some determined threshold period of time.

Authentication Attempts 340 associated with the Accounts 302 through 305 may be logged. The event logs may be transferred to the Database 330 for access by the Management Console 310. The event logs may be transferred on a periodic basis on predetermined intervals, upon request, or using similar techniques. In one exemplary embodiment the logs are active directory logs. The logs may be stored in the Database 330 or information about the logs may be stored in the Database 330.

The Management Console 310 may be within the same network or domain as the Monitored Environment 301, or it may be remote. Accordingly, at any given moment the Management Console 310 may receive event logs associated with accounts and pseudo-accounts located in the same or distinct networked environments, domains, or virtual machines. The Management Console 310 may be a computer, a server, a virtual machine, or the like. The Management Console 310 is operable to present one or more user interfaces by which the Management Console 310 may present information and receive instructions. In one exemplary embodiment the user interfaces may include a dashboard.

The Management Console 310 includes processes for searching the Database 330 for activity information related to one or more pseudo-accounts. The processes may be initiated upon receipt of logs, periodically, or by a user. Upon detection of activity associated with a pseudo-account a report may be generated. This report may be stored and made available for further review, may trigger a flag for a user, or it may trigger automatic remediation.

If activity is detected in connection with a pseudo-account, then remediation may be triggered. If the activity logs include details about identity information related to the entity responsible for the activity, then techniques described herein, such as the Lateral Account Mapping or User Attribution, may be used to determine more information about the responsible entity and trigger security policy updates and/or security policy enforcement.

The Communication Network 320 may have the same elements, structures and architectures described above with regard to Communication Network 150. The Communication Network 320 communicably links the Monitored Environment 301 to the Management Console 310.

Figure 7:
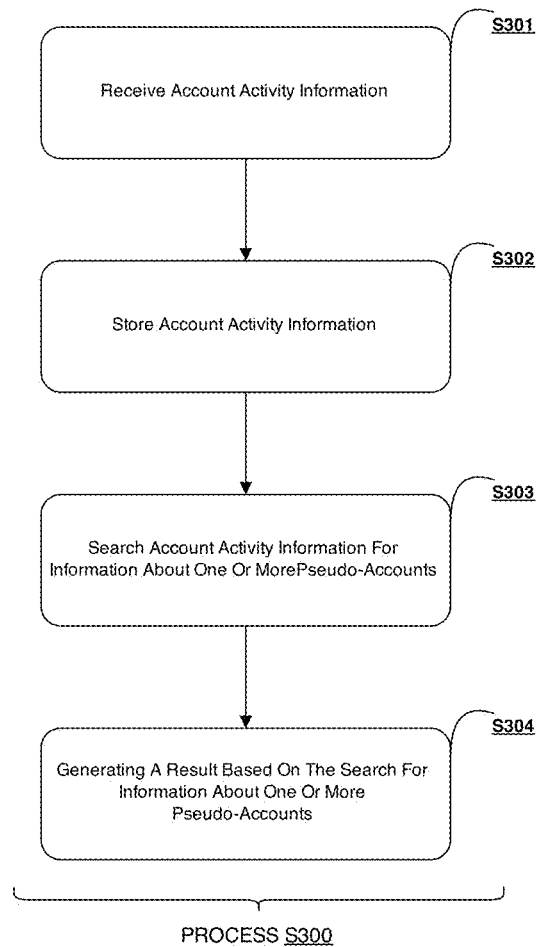
FIG. 7 illustrates a process for utilizing pseudo-accounts to detect activity that represents a security risk according to an exemplary embodiment of the invention.

The operation of the Honey User System 300 according to exemplary embodiments will now be described with reference to FIGS. 7, 8 and 9. FIG. 7 describes a Process S300 for utilizing pseudo-accounts to detect activity that represents a security risk according to an exemplary embodiment of the invention. First, the Management Console 310 receives activity information associated with Accounts 302 through 305, for example in the form of authentication logs (S301). The activity information associated with Accounts 302 through 305 is stored in the Database 330 (S302). The activity information stored in Database 330 is searched for activity information associated with one or more pseudo-accounts (S303). Based on the search results, a report may be generated indicating that there has been activity associated with a pseudo-account (S304).

Figure 8:
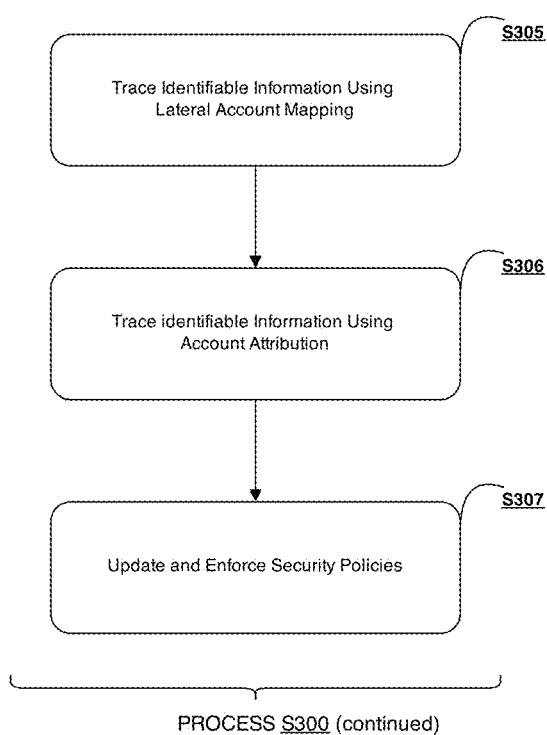
FIG. 8 illustrates a process for tracing and determining identifying information related to activity associated with a pseudo-account according to an exemplary embodiment of the invention.
Figure 9:
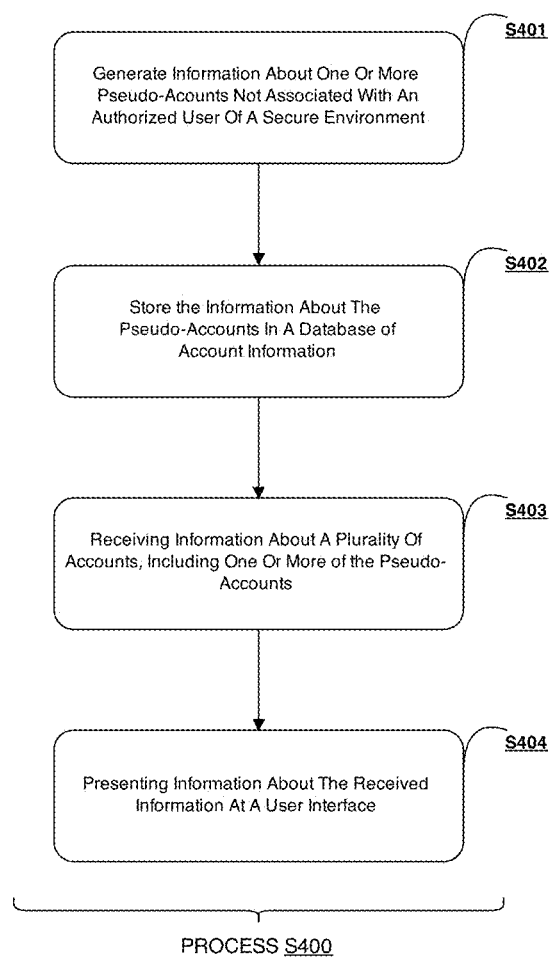
FIG. 9 illustrates a process for monitoring a networked environment utilizing pseudo-accounts to detect activity that represents a security risk according to an exemplary embodiment of the invention.
Figure 11:
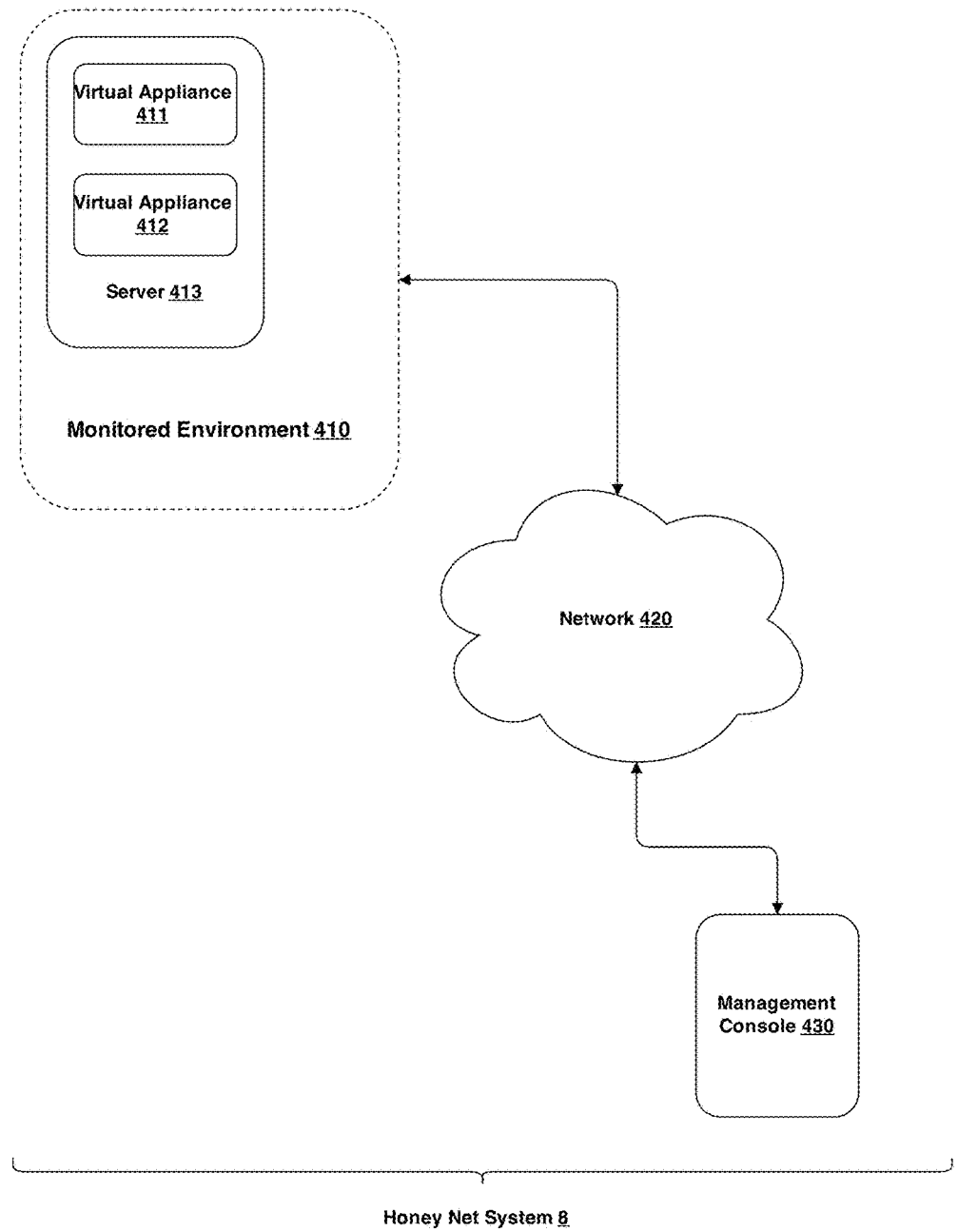
FIG. 11 illustrates a system that manages virtual appliances through a central console according to an exemplary embodiment of the invention.

Turning to FIG. 8, upon identifying activity associated with a pseudo-account from event logs, in one exemplary embodiment the identifying information may be sent to an Account Mapping System 1 (FIG. 1) for tracing (S305), security policy update, and security policy enforcement, as described herein. Further, activity associated with a pseudo-account may be tracked back to a specific account using a tool such as the User Attribution Engine 200. (S306). The account lateral movement mapping data generated and stored by the Correlation Engine 140, and the user identity information generated by the User Attribution Engine 200 may be used to update and enforce security policies, including security policies associated with the networks or domains having the pseudo-accounts.

An exemplary operation of the Management Console 310 will now be described with reference to Process S400 in FIG. 9. First, information about one or more pseudo-accounts, for example, of an asset or process within the secure environment not associated with an authorized user of a secure environment is generated (S401). The information about the pseudo-accounts is stored in a database of account information that may include information about accounts that are associated with authorized users of a secure environment (S402). Next, the Management Console 310 receives information about activity associated with a plurality of accounts, including one or more pseudo-accounts (S403). The information may be in the form of event logs, and the activity may include, for example, authentication attempts—whether successful or not. Information about the received information may be presented by way of a user interface at the Management Console 310 (S404). The information may include whether activity was detected in connection with one or more pseudo-accounts and be in the form of a report. The information may include suggested remediation techniques and further identifying information associated with the activity. A user may be able to initiate remediation and mitigation from the user interface, or such remediation and mitigation may occur automatically.

In one exemplary embodiment the user interfaces may include a Dashboard 400, which is illustrated in FIG. 10. The Dashboard 400 may include state information about one or more monitored networks, and the pseudo-accounts in those monitored networks. For example, for a monitored network Dashboard 400 indicates categories and sub-categories of assets, restricted assets, and threats. Dashboard 400 also indicates information about the pseudo-accounts (called a "Honey user account") including the number of authentication attempts within in a pre-defined time period. Information may also be provided about the various ingress locations into the monitored network. Details may be drilled down to the user level and indicate their status—e.g., threat level. In one embodiment, the Dashboard 400 may be operable to send information and commands to the various assets in the monitored network, including the pseudo-accounts.

A Honey Net System 8 according to an exemplary embodiment of the present invention, including an exemplary operation thereof, will now be described with reference to FIGS. 11, 12, 13, and 14. Honey Net System 8 enables an end user (such as a network administrator) to deploy one or more preconfigured "honeypot" virtual appliances on one or more servers on one or more monitored networks, and then use a central monitoring console to manage the feedback from these virtual appliances and view it alongside other activity on the network. Honey Net System 8 includes a Monitored Environment 410, a Management Console 430, and a Communications Network 420 communicably linking the Monitored Environment 410 and the Management Console 430. The Management Console 430 may reside within the Monitored Environment 410 or it may reside remote from the Monitored Environment 410, e.g., in a different network.

The Monitored Environment 410 may be a network, domain, intranet, or similar environments. In one exemplary embodiment the Monitored Environment 410 is a corporate network. The Monitored Environment 410 may include one or more preconfigured "honeypot" virtual appliances, which are illustrated as Virtual Appliance 411 and Virtual Appliance 412 in FIG. 11. Virtual Appliance 411 and Virtual Appliance 412 are deployed on Server 413 in the Monitored Environment 410, and are communicably linked to the Management Console 430 via Communications Network 420.

Communications Network 420 may have the same elements, structures and architectures described with regard to Communication Network 150, above.

The Management Console 430 may be a computer, a server, a virtual machine, or the like, and is operable to present one or more user interfaces by which the Management Console 430 may present information and receive instructions. In one exemplary embodiment the user interfaces may include a dashboard.

The Management Console 430 is operable to send instructions to the virtual appliances connected to it, including updates, tasks to perform at the Monitored Environment 410, and configuration changes. The Management Console 430 may also display information about the virtual appliances communicably linked to it—including Virtual Appliance 411 and Virtual Appliance 412—and the Monitored Environment 410, generally.

Figure 12:
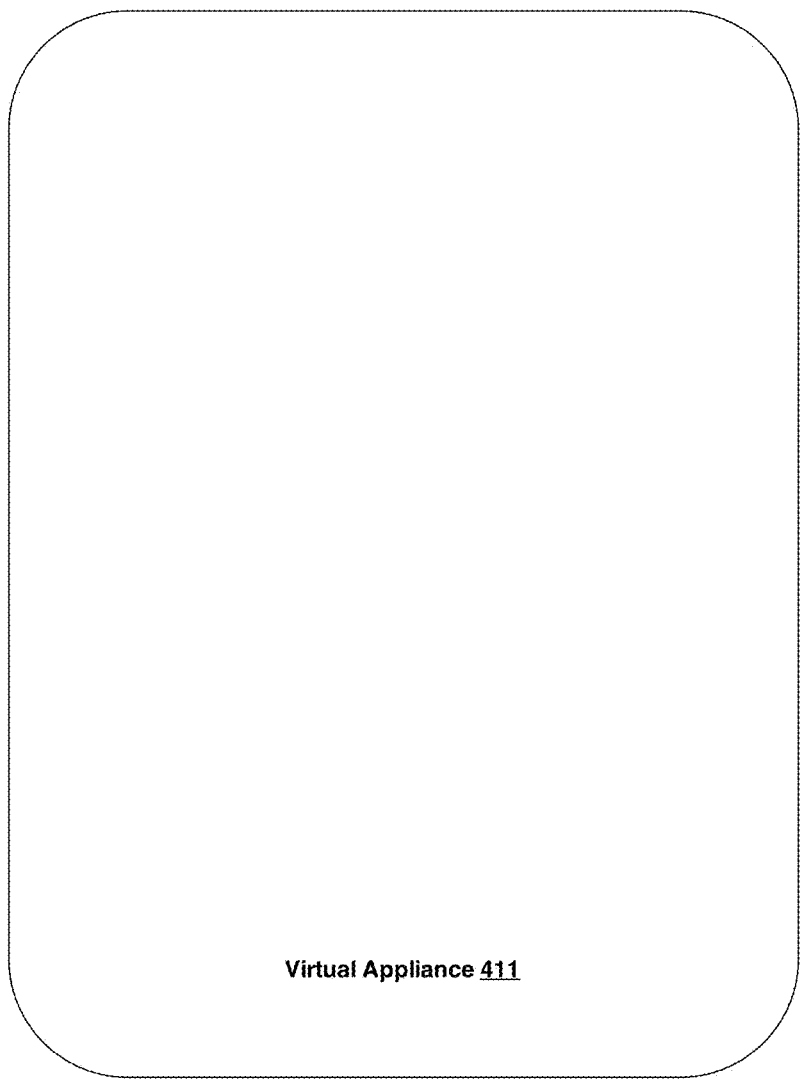
FIG. 12 illustrates a virtual appliance according to an exemplary embodiment of the invention.

FIG. 12 is an illustration of Virtual Appliance 411 of Honey Net System 8, according to an exemplary embodiment.

Figure 13:
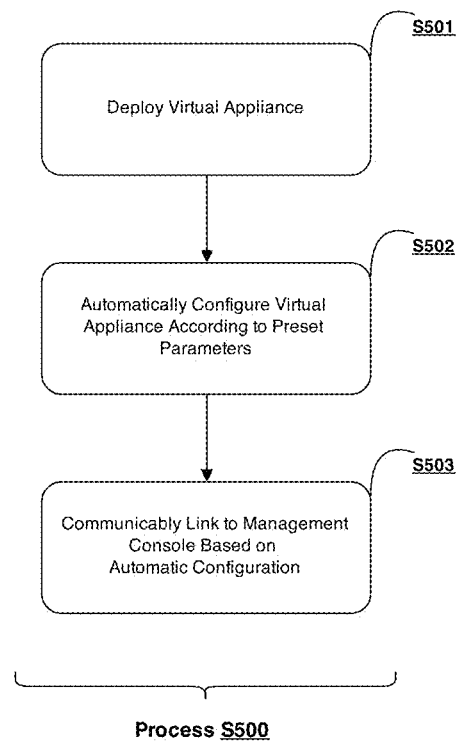
FIG. 13 illustrates a process for deploying virtual appliances according to an exemplary embodiment of the invention.

An exemplary operation of the Honey Net System 8 for deployment of pre-configured virtual appliances will now be described with reference to FIG. 13 and Process S500. First, Virtual Appliance 411 and Virtual Appliance 412 are deployed at Server 413 of Monitored Environment 410 (S501). The virtual appliances may be deployed by an administrator or automatically by a policy engine according to a security plan. Next, Virtual Appliance 411 and Virtual Appliance 412 are automatically configured according to present parameters (S502). After being automatically configured, the Virtual Appliance 411 and the Virtual Appliance 412 communicably link to the Management Console Module 430.

Figure 14:
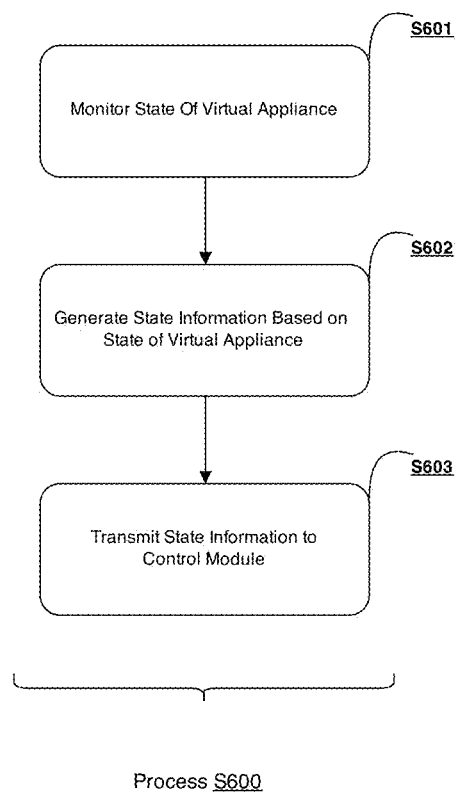
FIG. 14 illustrates a process for monitoring and transmitting state information about virtual appliances deployed in a monitored environment according to an exemplary embodiment of the invention.

An exemplary operation of the Honey Net System 8 for monitoring the Monitored Environment 410 will now be described with reference to FIG. 14 and Process S600. First, the Virtual Appliance 411 and Virtual Appliance 412 monitor their states in real-time (S601). Each virtual appliance logs state information based on its state in real time, at a given time, or over a given time period (S602). The state information is transmitted to the Control Module 430 (S603). The state information may be raw state information about each virtual appliance, information about state changes of each virtual appliance, information about specific state changes for each virtual appliance, or combinations thereof. Depending on the degree of analysis and processing of the information performed at the virtual appliance, the Management Console 430 may also analyze the information. State changes recognized and included in the state information may include access attempts, authentication attempts, port scans, operating status, and the like.

In the embodiment where state information is collected about access attempts and authentication attempts, the virtual appliances may have access to a database of permitted users, permitted accounts, or other authentication credentials.

Figure 15:
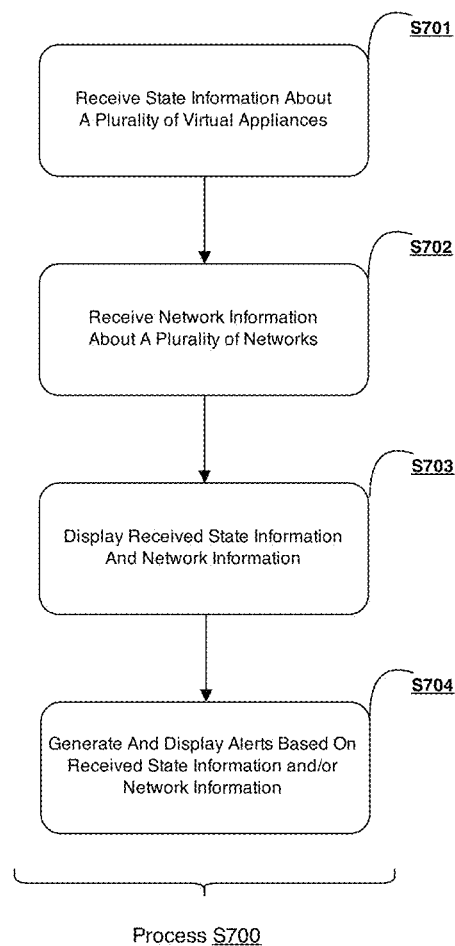
FIG. 15 illustrates a process for managing virtual appliances through a central console according to an exemplary embodiment of the invention.

An exemplary operation of the Honey Net System 8 for monitoring of the Monitored Environment 410 will now be described with reference to FIG. 15 and Process S700. First, the Management Console 430 receives state information about a number of virtual appliances, including Virtual Appliance 411 and Virtual Appliance 412 (S701). The Management Console 430 may receive state information from virtual appliances deployed in the same monitored environment or across multiple monitored environments. The Management Console 430 also receives network information about the Monitored Environment 410 (S702). The Management Console 430 may display the received state information and network information via a graphical use interface or in the form of a report (S703). In one exemplary embodiment, the Management Console 430 displays the state information and network information based on instructions received via the graphical use interface. Finally, the Management Console 430 may display alerts based on the received state information and/or network information (S704). The alerts may then be input to other systems for management security policies associated with the Monitored Environment 410.

The Honey Net System 8 may be part of a security ecosystem or suite that includes other features and processes described herein. For example, the Honey Net System 8 may be linked to a User Attribution Engine 200 (FIG. 5), and users or accounts associated with state changes at a virtual appliance may be identified.

Figure 16:
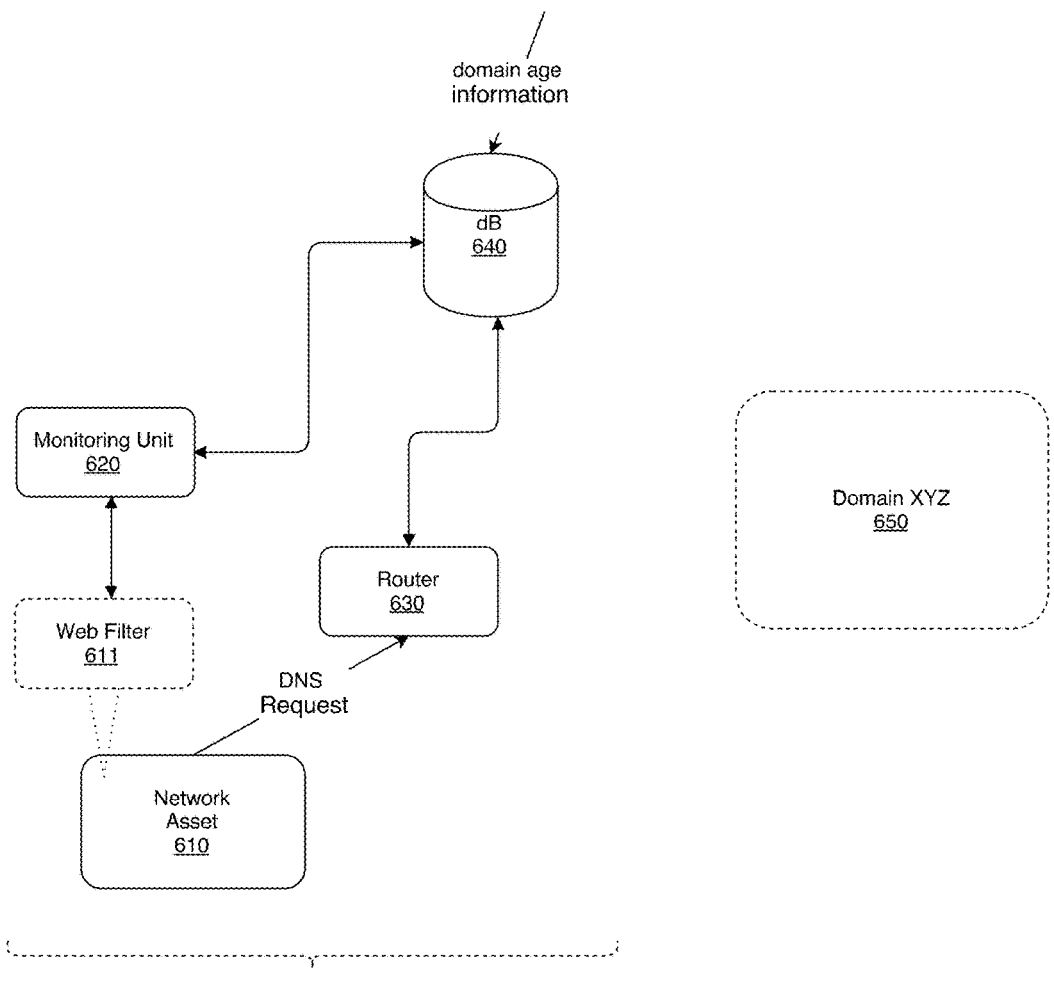
FIG. 16 illustrates a security ecosystem according to an exemplary embodiment of the invention.
Figure 17:
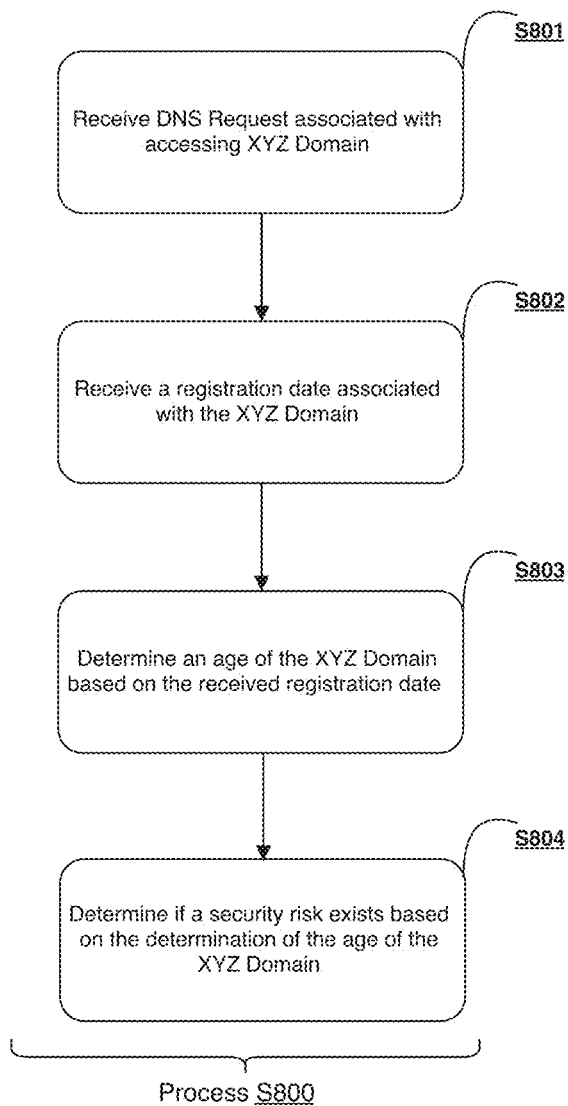
FIG. 17 illustrates a system that utilizes domain age information to manage a network according to an exemplary embodiment of the invention.

FIG. 16 illustrates a Security Ecosystem 9, according to an exemplary embodiment of the present invention. The Security Ecosystem 9 includes a Monitored Environment 510, a Network 520, a Management Console 530, a Correlation Engine 540, and a User Attribution Engine 550. The Monitored Environment 510 includes Virtual Appliance 511, Pseudo Account 512, Account 514, and Asset 513. The Correlation Engine 540 and User Attribution Engine 550 receive logs and other data from the various devices in the Monitored Environment 510, including the Virtual Appliance 511, Pseudo Account 512, Account 514, and Asset 513. The Security Ecosystem 9 may have access to a Database 561 with domain registration information that is usable by a Router 560 that performs domain age tracking, as described above. Alternatively the Management Console 530 may perform domain age tracking by reviewing logs from a web filter or other monitoring tool.

The Network 520 may have the same elements, structures and architectures described with regard to Communication Network 150, above.

The Correlation Engine(s) 540 may operate similar to, and may have the same elements, structures and architectures associated with the Correlation Engine 130, described above, to correlate account information in order to generate account lateral movement mapping data. The Database 541 may be used to store the account lateral movement mapping data as well as other data relating to the correlation process.

The User Attribution Engine(s) 550 may operate similar to, and may have the same elements, structures and architectures associated with the User Attribution Engine 200, described above, to associate events with specific users. The Database 551 may include an identity store with information associating accounts with device level information.

The Management Console 530 may operate similar to, and may have the same elements, structures, functionality, and architectures associated with the Management Console 310 and Management Console 430, described above. In this manner, the Management Console 530 may be used to display, manage and collect information as part of a Honey Net, such as Honey System 8, and a Honey User System 6; as well as tap into the functionality of the User Attribution Engine 550 and Correlation Engine 540.

FIG. 16 illustrates a Domain Age System 10 that utilizes domain age information to monitor and secure a network according to an exemplary embodiment of the present invention. The Domain Age System 10 includes a Network Asset 610, a Monitoring Unit 620, a Router 630, and a Database 640. The Network Asset 610 may be anything that is part of, relates to, or supports information-related activities. Network assets may include hardware devices (e.g., servers, switches, and general purpose computers), software, databases, and combinations thereof. In the embodiment described herein, the Network Asset 610 is an asset capable of initiating a communication or transfer to a remote domain, in this case, Domain XYZ 650. In one embodiment the communication is a DNS Request.

The Network Asset 610 is communicably linked to Router 630. When the Router 630 receives a DNS Request it uses domain information associated with the DNS Request to request domain age information from the Database 640 related to the DNS Request. The Router 630 may flag information in the DNS request where the accessed domain's age is shorter than a predetermined threshold (e.g., 1 day, 7 days, 30 days, etc.). Information about the domain may be stored, an alert may be generated, and/or remediation may be initiated to secure the Domain Age System 10. In one exemplary embodiment a proxy server replaces the Router 630.

The Database 640 stores information about the registration date of domains. This information may be provided by a private resource or from public resources. The Database 640 may be part of the same network as the Domain Age System 10 or may be remote from the Domain Age System 10.

In one embodiment, the Network Asset 610 may include a Web Filter 611 that monitors and/or restricts access to content by the Network Asset 610. The Web Filter 611 may be software executing on the Network Asset 610 or may be remote from the Network Asset 610. The Web Filter 611 stores logs of information (e.g., about destination addresses and domains) about the requests sent by the Network Asset 610 over various means, including e-mail, browser, or similar means.

The Monitoring Unit 620 is communicably linked to the Network Asset 610 and the Database 640. The Monitoring Unit 620 may receive the logs associated with the Web Filter 611, for example upon request or periodically. The Monitoring Unit 620 may compare the information in the logs about the domains from which the Network Asset 610 requested or received content to the domain age information stored in the Database 640. The Monitoring Unit 620 may flag information in the logs where the accessed domain's age does is shorter than a predetermined threshold (e.g., 1 day, 7 days, 30 days, etc.).

Figure 18:
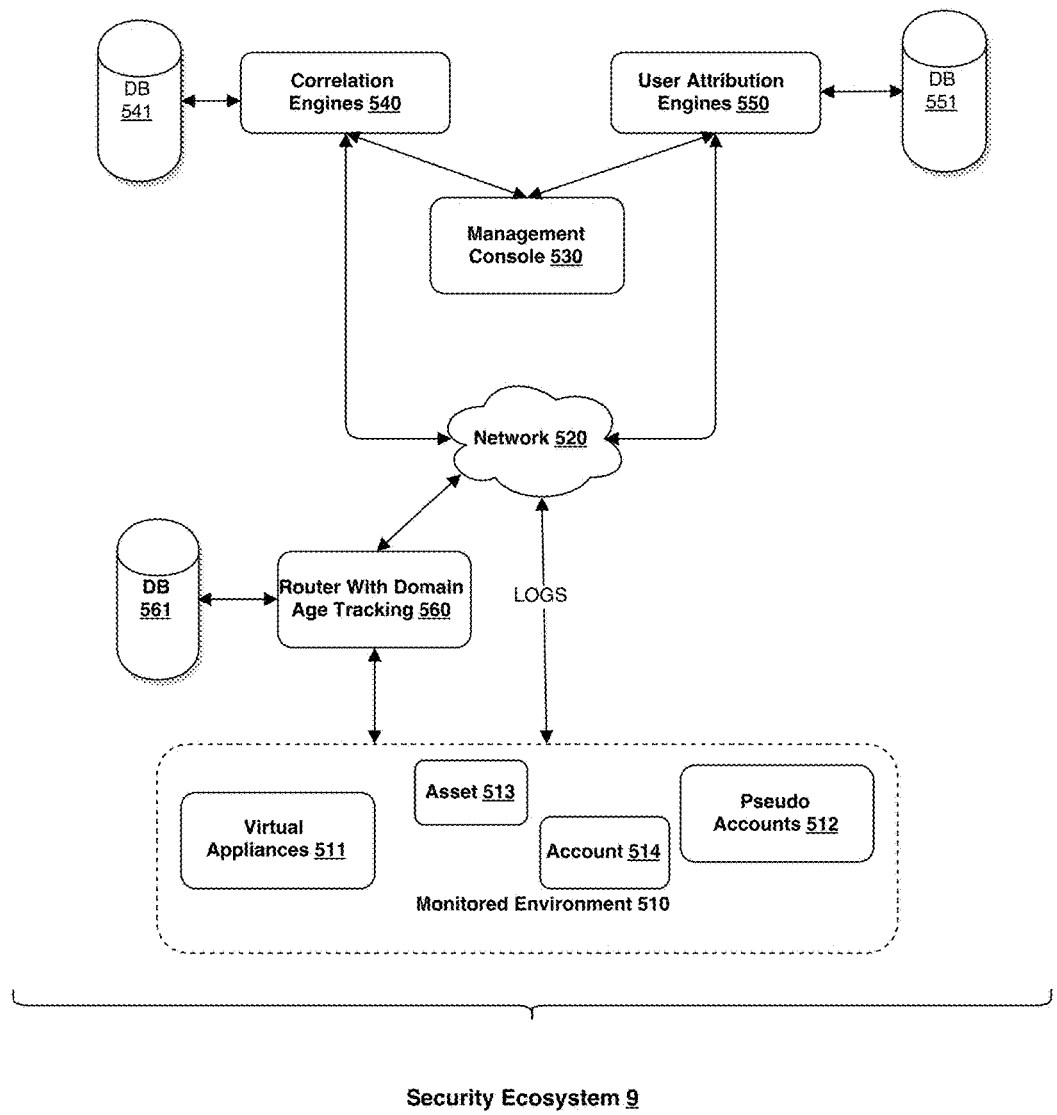
FIG. 18 illustrates a process for managing a network utilizing domain age information according to an exemplary embodiment of the invention.

The operation of the Domain Age System 10 according to an exemplary embodiment will now be described with reference to FIG. 18. FIG. 18 describes a Process 800 for utilizing domain age information to monitor, track, and alert based on attempts to access or communicate with high-risk domains. First, the Network Asset 610 generates a DNS Request that is received by the Router 630 (S801). Upon receipt of the DNS Request the Router 630 receives registration date information about the domain associated with the DNS Request from the Database 640 (S802). Next, the age of the domain associated with the DNS Request is determined based on the registration date information (S803). Finally, if the age of the domain is shorter than a predetermined threshold (e.g., 1 day, 7 days, 30 days, etc.) then the system determines that a security risk exists in connection with the DNS Request (S804).

Those skilled in the art will appreciate that the inventions described herein may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

The System 1, System 5, System 300, System 8, and System 9 may include a plurality of software processing modules stored in a memory as described above and executed on a processor in the manner described herein. The program modules may be in the form of any suitable programming language, which is converted to machine language or object code to allow the processor or processors to read the instructions.

The computer system may include a general-purpose computing device in the form of a computer including a processing unit, a system memory, and a system bus that couples various system components including the system memory to the processing unit.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID integrated circuits, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processor and/or memory may be composed of different physical pieces of equipment.

The computing environment may also include other removable/non-removable, volatile/nonvolatile computer storage media.

Certain embodiments of the present inventions were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for identifying a network security risk, the method comprising:
   generating, using a web filter, a web activity log comprising at least one domain that is the subject of a request via the internet for information and an access date associated with the request, wherein the request is made by a pseudo account created with credentials that are not assigned to a user and stored in a database of known pseudo accounts and known accounts of authorized users, wherein the pseudo account is an account that has been inactive for a determined threshold period of time or an account that has been marked for deletion;
   requesting domain age data for the at least one domain using a router device;
   receiving a registration date of the at least one domain from a database module;
   identifying, using a management console, a domain in the web activity log as a security risk based on the time lapsed between the access date associated with the request for the identified domain and the registration date of the domain being less than a predetermined threshold and based on the request being made by the pseudo account created with credentials that are not assigned to a user; and
   restricting access to the domain identified as a security risk using the web filter based on the time lapsed between the access date associated with the request for the identified domain and the registration date of the domain being less than a predetermined threshold and based on the request being made by the pseudo account created with credentials that are not assigned to a user; and
   communicating data regarding the pseudo account activity to an account mapping system configured to track pseudo account activity to an account of an authorized user, wherein the account mapping system is in communication with the database of known pseudo accounts and known accounts of authorized users;
   tracking the activity associated with the pseudo account to an account of an authorized user; and
   performing at least one of:
   implementing a security policy update based on the pseudo account being tracked to the account of an authorized user, and
   enforcing a security policy based on the pseudo account being tracked to the account of an authorized user.

2. The method of claim 1, wherein the request for information includes a domain name system (DNS) request.

3. The method of claim 1, wherein receiving the registration date of the at least one domain comprises querying a database for the date of registration of the at least one domain.

4. The method of claim 1, further comprising generating an alert based on an identified security risk.

5. The method of claim 1, further comprising mitigating the identified security risk.

6. A system for identifying a security risk, the system comprising:
   one or more computer readable storage media configured as a database module of registration information for a plurality of domains;
   one or more hardware processors coupled with the one or more computer readable storage media; and
   program instructions stored on the one or more computer readable storage media that, when read and executed by the one or more hardware processors, direct the system to implement:
   a web filter configured to generate a web activity log comprising at least one domain that is the subject of a request via the internet for information and an access date associated with the request, wherein the request is made by a pseudo account created with credentials that are not assigned to a user and stored in a database of known pseudo accounts and known accounts of authorized users, wherein the pseudo account is an account that has been inactive for a threshold period of time or an account that has been marked for deletion; and
   a management console configured to, retrieve a registration date of at least one domain in the web activity log from the database module, and identify a domain in the web activity log as a security risk based on the time lapsed between the access date associated with the identified domain and the registration date of the domain being less than a predetermined threshold and based on the request being made by the pseudo account created with credentials that are not assigned to a user,
   wherein the web filter is further configured to restrict access to the domain identified as a security risk using the web filter based on the time lapsed between the access date associated with the request for the identified domain and the registration date of the domain being less than a predetermined threshold and based on the request being made by the pseudo account created with credentials that are not assigned to a user; and
   an account mapping system in communication with the database of known pseudo accounts and known accounts of authorized users and configured to:
   track pseudo account activity to an account of an authorized user,
   track the activity associated with the pseudo account to an account of an authorized user, and
   perform at least one of: implementing a security policy update based on the pseudo account being tracked to the account of an authorized user, and enforcing a security policy based on the pseudo account being tracked to the account of an authorized user.

7. The system according to claim 6, wherein the request for information includes a domain name system request.

8. The system according to claim 6, wherein the database module is a public database.

9. The system according to claim 6, wherein the database module is a private database.

10. The system according to claim 6, wherein the management console is further configured to generate an alert based on the identified security risk.

11. The system according to claim 6, wherein the management console is further configured to initiate mitigation steps based on the identified security risk.

12. The system according to claim 6, wherein the management console is a proxy server.

13. The system according to claim 6, wherein the database module and the management console are co-located on the same network.

14. The system according to claim 6, wherein the management console is further configured to associate at least one user with the identified security risk is identified based on an authentication record in the database module.

15. The system according to claim 6, wherein the web activity log includes at least one device label to identify a network asset, wherein the at least one device label is a domain name or an Internet Protocol address.

16. The system according to claim 14, wherein the authentication record is an active directory log.

* * * * *